(12) United States Patent
Heinrich et al.

(10) Patent No.: US 7,427,912 B1
(45) Date of Patent: *Sep. 23, 2008

(54) METHOD AND SYSTEM FOR STORAGE AND RECOVERY OF VITAL INFORMATION ON RADIO FREQUENCY TRANSPONDERS

(75) Inventors: Harley Kent Heinrich, Everett, WA (US); Daniel J. Friedman, Sleepy Hollow, NY (US)

(73) Assignee: Intermec IP Corp., Everett, WA (US)

( * ) Notice: Subject to any disclaimer, the term of this patent is extended or adjusted under 35 U.S.C. 154(b) by 384 days.

This patent is subject to a terminal disclaimer.

(21) Appl. No.: 10/662,950

(22) Filed: Sep. 15, 2003

Related U.S. Application Data

(63) Continuation-in-part of application No. 10/373,628, filed on Feb. 24, 2003, now abandoned, which is a continuation-in-part of application No. 10/167,227, filed on Jun. 11, 2002, now abandoned, which is a continuation of application No. 09/330,786, filed on Jun. 11, 1999, now Pat. No. 6,404,325, which is a continuation-in-part of application No. 09/227,649, filed on Jan. 8, 1999, now abandoned.

(60) Provisional application No. 60/070,758, filed on Jan. 8, 1998.

(51) Int. Cl.
*H04Q 5/22* (2006.01)
(52) U.S. Cl. ........... 340/10.34; 340/10.1; 340/10.51; 340/10.52
(58) Field of Classification Search ........... 340/10.34, 340/10.51, 10.52, 825.3, 10.1, 572.1, 7.32; 380/23, 4.23
See application file for complete search history.

(56) References Cited

U.S. PATENT DOCUMENTS 4,674,618 A   6/1987   Eglise et al.

(Continued)

FOREIGN PATENT DOCUMENTS

| EP | 0 733 988 B1 | 9/1996 |
| GB | 2 333 495 A | 7/1999 |
| JP | 09 135481 A | 5/1997 |
| WO | WO 01/65712 A1 | 9/2001 |

OTHER PUBLICATIONS

D. Friedman, H. Heinrich, D-W. Duan, "A Low-Power CMOS Integrated Circuit for Field-Powered Radio Frequency Identification Tags", Digest of Technical Papers of the 1997 IEEE International Solid-State Circuits Conference, San Francisco, CA, Feb. 8, 1997, pp. 294, 295 and 474, ISSCC97/ Session 17/ TD: LowPower/ Low-Voltage Circuits/ Paper SA 17.5.

(Continued)

*Primary Examiner*—Brian Zimmerman?
*Assistant Examiner*—Nam V Nguyen
(74) *Attorney, Agent, or Firm*—Paul A. Maltseff; John H. Sherman

(57) ABSTRACT

The present invention assures the integrity of state information retained by a Radio Frequency Transponder during a loss of power. During the regular operation of the Transponder power is provided to a voltage-storing device powering an information retention mechanism of the Transponder. After the loss and reestablishing of power to the Transponder but before the Transponder is restarted, the voltage-storing device is checked to determine whether sufficient power is present in the information retention mechanism to retain information without corruption. If sufficient power is present, a signal to indicate that fact is communicated to the Transponder and the stored information is restored. The Transponder is then restarted.

37 Claims, 3 Drawing Sheets

U.S. PATENT DOCUMENTS

| | | |
|---|---|---|
| 4,724,427 A | 2/1988 | Carroll |
| 4,955,038 A | 9/1990 | Lee et al. |
| 5,053,774 A | 10/1991 | Schuermann et al. |
| 5,214,409 A | 5/1993 | Beigel |
| 5,283,529 A | 2/1994 | Meier |
| 5,287,112 A | 2/1994 | Schuermann |
| 5,365,551 A | 11/1994 | Snodgrass et al. |
| 5,410,315 A | 4/1995 | Huber |
| 5,489,908 A | 2/1996 | Orthmann et al. |
| 5,515,053 A | 5/1996 | Hecht et al. |
| 5,517,194 A | 5/1996 | Carroll et al. |
| 5,521,602 A | 5/1996 | Carroll et al. |
| 5,525,992 A | 6/1996 | Froschermeier |
| 5,528,221 A | 6/1996 | Jeuch et al. |
| 5,537,105 A | 7/1996 | Marsh et al. |
| 5,550,547 A | 8/1996 | Chan et al. |
| 5,602,538 A | 2/1997 | Orthmann et al. |
| 5,686,902 A | 11/1997 | Reis et al. |
| 5,712,630 A | 1/1998 | Nanboku et al. |
| 5,787,174 A * | 7/1998 | Tuttle .................... 713/189 |
| 5,850,181 A | 12/1998 | Heinrich et al. |
| 5,889,489 A | 3/1999 | Friedman et al. |
| 6,157,321 A | 12/2000 | Ricci |
| 6,173,899 B1 | 1/2001 | Rozin |
| 6,198,381 B1 | 3/2001 | Turner et al. |
| 6,201,731 B1 | 3/2001 | Kamp et al. |
| 6,204,765 B1 | 3/2001 | Brady et al. |
| 6,288,629 B1 | 9/2001 | Cofino et al. |
| 6,404,325 B1 * | 6/2002 | Heinrich et al. .......... 340/10.34 |
| 6,812,841 B2 | 11/2004 | Heinrich et al. |
| 6,942,155 B1 | 9/2005 | Stewart et al. |

OTHER PUBLICATIONS

FinkenZeller, Klaus "The RFID Handbook", 1999, p. 172.

Kang, Sung-Mo & Leblebici, Yusuf "CMOS Digital Integrated Circuits, Analysis and Design", 1999, pp. 442-443.

Haldun Haznedar "Digital Microelectronics", 1991, pp. 444-446.

Chatterjee, P.K., et al. "A Survey of High-Density Dynamic RAM Cell Concepts," ED-26 IEEE Transactions on Electron Devices, Jun. 1979, pp. 827-839.

Taub, Herbert & Schilling, Donald "Digital Integrated Electronics", 1977, p. 46.

Demassa, Thomas A. "Electrical and Electronic Devices, Circuits, and Instruments", 1989, p. 46.

Ali Mazidi, Muhammad & Gillispie-Mazidi, Janice, "Assembly Language, Design and Interfacing", 1998, p. 238.

* cited by examiner

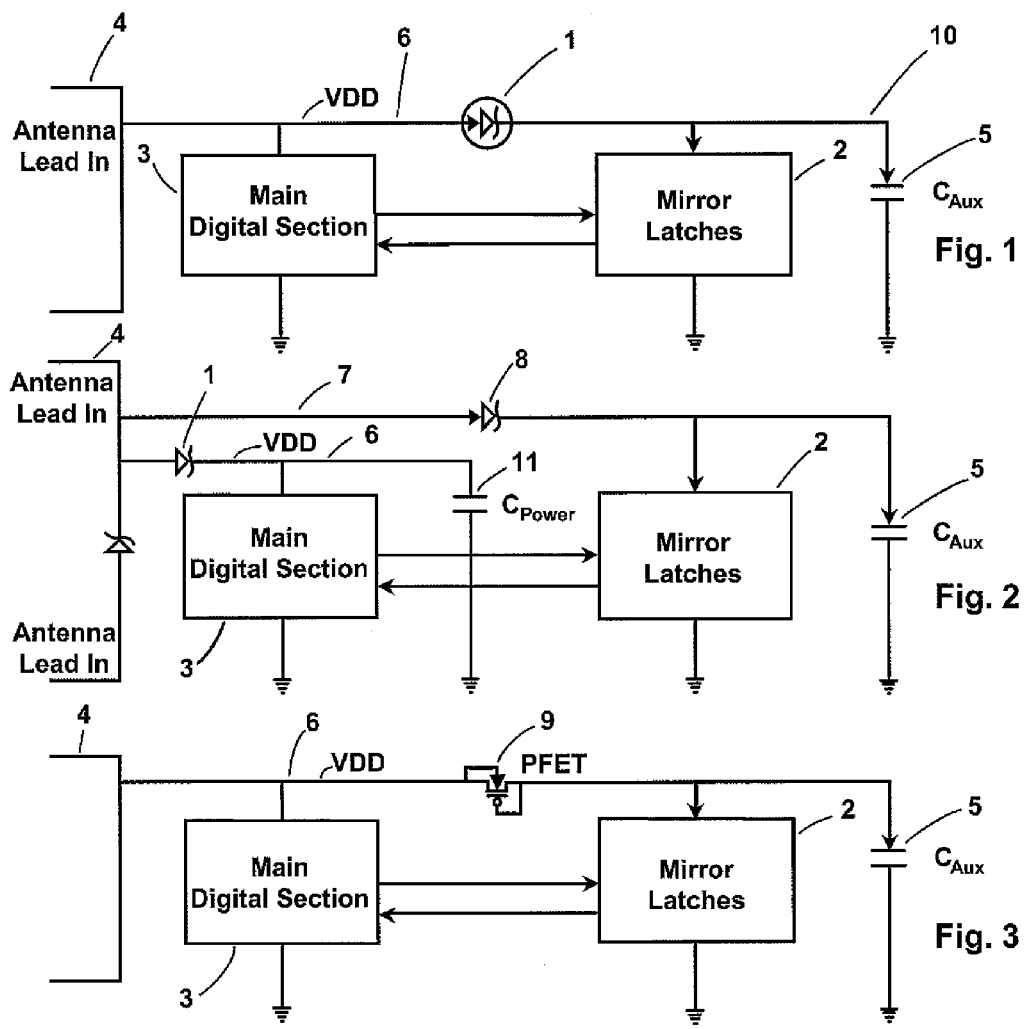

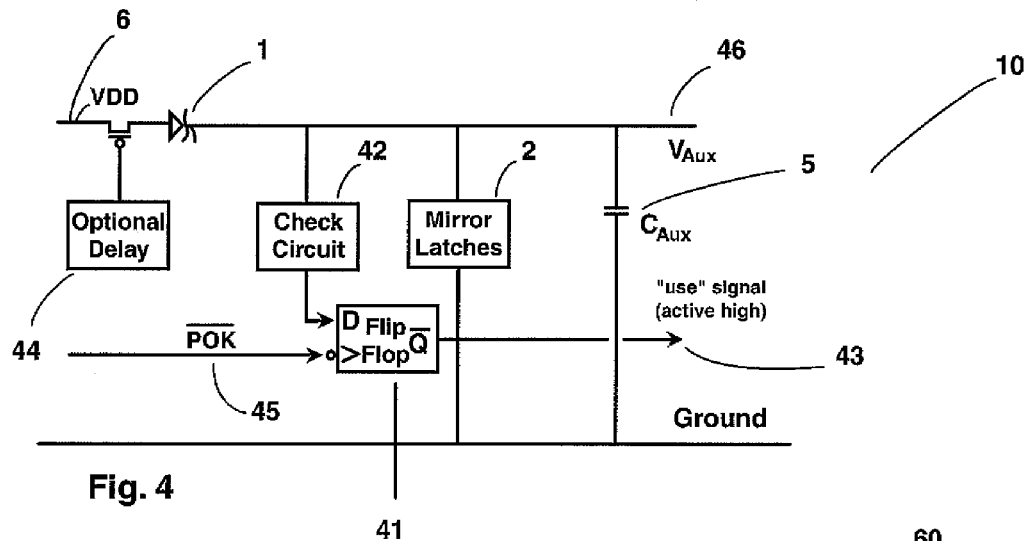
Fig. 4
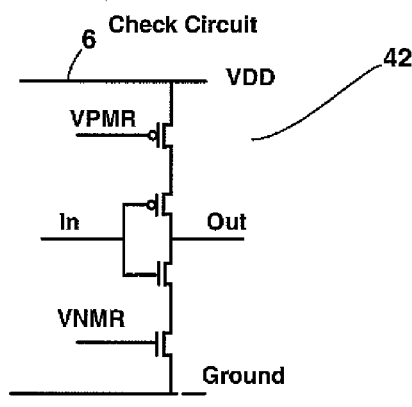
Fig. 5
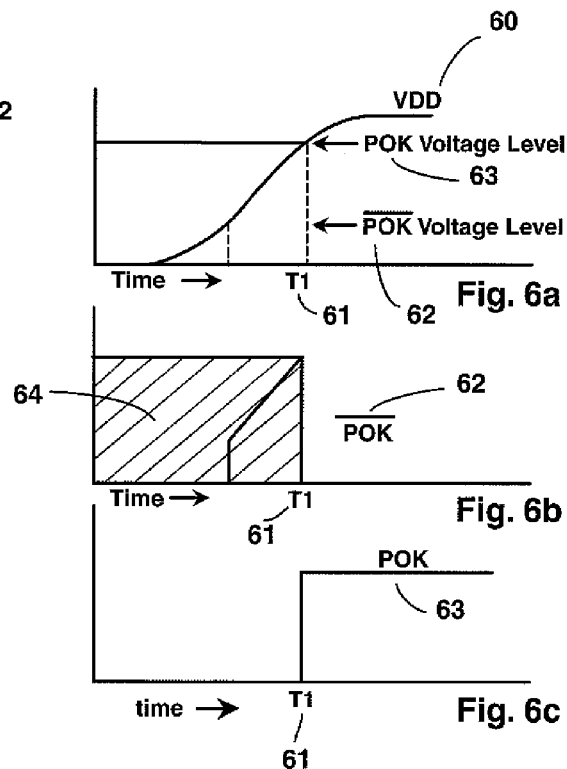
Fig. 6a
Fig. 6b
Fig. 6c
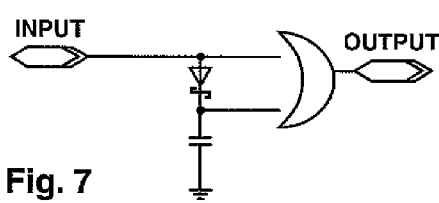
Fig. 7

US 7,427,912 B1

METHOD AND SYSTEM FOR STORAGE AND RECOVERY OF VITAL INFORMATION ON RADIO FREQUENCY TRANSPONDERS

CROSS REFERENCES TO RELATED APPLICATIONS

The present application is a continuation-in-part of application Ser. No. 10/373,628 filed Feb. 24, 2003 now abandoned, which is a continuation-in-part of application Ser. No. 10/167,227 filed Jun. 11, 2002 now abandoned, which is a continuation of application Ser. No. 09/330,786 filed Jun. 11, 1999, now U.S. Pat. No. 6,404,325 issued Jun. 11, 2002, which is a continuation-in-part of application Ser. No. 09/227,649 filed Jan. 8, 1999, now abandoned, which is a non-provisional application claiming the benefit of provisional Application No. 60/070,758 filed Jan. 8, 1998; the contents of said U.S. Pat. No. 6,404,325, said application Ser. No. 09/227,649 and said provisional Application No. 60/070,758 are incorporated herein by reference.

BACKGROUND OF THE INVENTION

1. Field of the Invention

The invention relates to the field of Radio Frequency Transponders and more specifically to retaining and restoring of valid state information by the Radio Frequency Transponders upon the reapplication of power.

2. Description of the Background of the Invention

Radio Frequency (RF) Transponders (tags) are used in a multiplicity of ways. They may be used in locating and identifying accompanying objects, as well as for transmitting information about the state of an object. It has been known since the early 60's that electronic components of transponders could be powered by a sequence of periodic signal bursts sent by a "base station" and received by a tag antenna on each of the transponders.

The RF electromagnetic field induces an alternating current in the transponder antenna that can be rectified by a RF diode of the transponder, and the rectified current can be used for a power supply for the electronic components of the transponder. The current induced in the transponder antenna from the incoming RF energy would thus be changed, and the change in the alternating current changes or modulates the RF power radiated from the transponder antenna back to the base station. This change in the radiated power from the transponder antenna is picked up by the base station antenna. Thus, the transponder antenna broadcasts a return signal without itself having a self contained power supply.

The "rebroadcast" of the incoming RF energy is conventionally called "back scattering", even though the transponder broadcasts the energy in a pattern determined solely by the transponder antenna. Since this type of transponder carries no power supply of its own, it is called a "passive" transponder to distinguish it from a transponder containing a battery or other energy supply, conventionally called an active transponder.

As an example, consider an RF tag designed to respond equally well to signals at frequencies ranging from 2.425 GHz to 2.475 GHz in an ideal environment. In a less then ideal environment, where there are other RF tags, metal objects, water-filled objects, etc. disposed in close proximity to a particular RF tag that is attempting to communicate with the base station, the RF energy available at a particular frequency to be received by the particular RF tag may be attenuated. This situation is analogous to repositioning a TV or a radio antenna to get the strongest reception. Similar to the effect of the person repositioning the antenna on the reception of the antenna, the presence of other tags and/or objects interferes with the RF reception of a particular tag. Additionally to comply with the FCC regulations, the carrier frequency used by the base station hops over relatively narrow channels of up to 1 MHz wide in the allowed band, e.g., 2.400 to 2.483 GHz in the 2.450 GHz case, during communication.

When an array of tags is being interrogate by a base station, it is possible for very different field strengths to be available to tags depending on the carrier frequency of that channel being used by the base station at the time of the communication and on the different positions of tags in the array. For instance, the first tag at a first position may be well powered when the base station operates at 2.422 and 2.463 GHz but not at 2.447 GHz, while a second tag at a second different position may be well-powered when the base station operates at 2.463 GHz and 2.447 GHz, but not 2.422 GHz. These differences are related not to the RF tag design but to the instantaneous RF environment of the individual RF tag at the time the interrogation by the base station occurs.

If power being supplied to the RF tag has been removed for even short time duration, the state information being maintained or stored by the RF tag is lost. For example, when the RF burst powering the RF tag falls off, the tag power, which for passive tags is maintained by a storage capacitor, may be lost in as little as 100 microseconds. The state information of the RF tag is then also lost.

Losing the state information of the RF tag is particularly injurious when a base station sending a polarized RF is interrogating an array of RF tags having antennas polarized in different manners. When some RF tags may not be powered up by a particular frequency used, the communication protocol will attempt to talk to each tag in the array.

RF tags may have major and minor states. The major states may include the "ID," "READY," and "DATA-EXCHANGE" states. Each RF tag identifies itself to the base station in the "ID" state, lets the base station know that it is ready to transfer data in the "READY" state, and sends data in the "DATA-EXCHANGE" state. The minor states include information such as the counter value used during the identification protocol initiated from the base station.

When a RF signal burst of a first frequency is sent from the base station to an array of RF tags, some of RF tags in the array do receive sufficient power to operate from that signal burst and will proceed to operate through the stages or states of operation, such as entering the "READY" or "DATA-EXCHANGE" states. The RF tag is typically operated cyclically through those states; in each cycle the states are carried out in the order set out above. Thus if the base station knows in which state a particular tag is operating, it has an effective "book mark" as to where in the cycle this particular tag is operating. When the RF environment changes or when the base station hops to a new carrier frequency, some of the tags that were previously powered, will not now receive sufficient power and will no longer be able to operate. At the same time, other RF tags in the array that previously had insufficient power to operate will now become powered up by the RF burst of the new frequency and start working.

An illustrative cycle of operation of the array of ten RF tags may be described as follows:

1. The base station or the reader is on channel one and RF tags 1-8 respond by beginning their participation in the identification protocol. All eight tags are successfully identified.

2. The reader now hops to channel two, the frequency of channel 2 allows tags 7-9 to be powered. Tag 9 will now respond by beginning participation in the identification protocol, while tags 1-6 lose their power and therefore stop participating. Since tags 7 and 8 were already identified and continue to be powered sufficiently when operating on channel, they do not participate in the protocol.

3. The reader hops to channel 3. The frequency of channel 3 allows tags 2-10 to be powered. Tags 7-9 stay powered and do not participate in the protocol. However, tags 2-6 must be re-identified in order to identify the one truly new tag 10.

The RF tags that are not well powered lose track of state information. This state information is essentially a bookmark in the communication sequence between the tag and the base station. In running an ID protocol, for example, tags that newly enter the field as well as tags that have lost power and then regained it while remaining in the field are treated equally; they both have to be identified from scratch, wasting time. If state information could be maintained, the tags that remain in the field and are not powered sufficiently even only for brief periods of time would not have to reenter the protocol and thus system level performance with regard to tag identification would be improved.

SUMMARY OF THE INVENTION

What is needed is for the state information of each RF tag to be maintained in order to prevent that RF tag from participating in the protocol with the base station, in identifying previously unidentified tags of a tag array therefore improving system performance.

The present invention assures the integrity of state information retained by the RF tags during a loss of power. At the time of the regular operation of each RF tag, the power is provided to a voltage-storing device, such as a capacitor, powering an information retention mechanism of the RF tag. The power source for that voltage storing device may be directed through a device such as a diode or a PFET, which may be dedicated or shared with other components of the RF tag.

After the loss and reestablishing of power to the transponder but before the transponder restarts, the transponder checks the voltage-storing device powering the information retention mechanism to determine whether sufficient power is present to retain information without corruption. Additionally, after the power is restored, the delaying circuitry of the transponder may delay the restart to assure proper determination of whether sufficient power is present. If sufficient power is present, the transponder communicates a signal to indicate that fact, the stored information is restored and the transponder restarts.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which:

FIG. 1 is a block diagram showing an exemplary Radio Frequency Transponder circuitry for retaining state information during a period when power is not supplied to the transponder.

FIG. 2 is a block diagram showing an alternative Radio Frequency Transponder circuitry where separate power sources are provided to power the circuitry and to charge a capacitor for information retention.

FIG. 3 is a block diagram showing an alternative Radio Frequency Transponder circuitry where a PFET transistor is used.

FIG. 4 is a block diagram showing a Radio Frequency Transponder circuitry where voltage across a capacitor is measured to determine the state of retained information.

FIG. 5 is a block diagram showing an exemplary voltage check circuitry, which may be used by the present invention.

FIGS. 6a-c are time/voltage diagrams showing good and bad power levels.

FIG. 7 shows a sample implementation for a state holding cell.

DETAILED DESCRIPTION OF THE INVENTION

Figure 8:
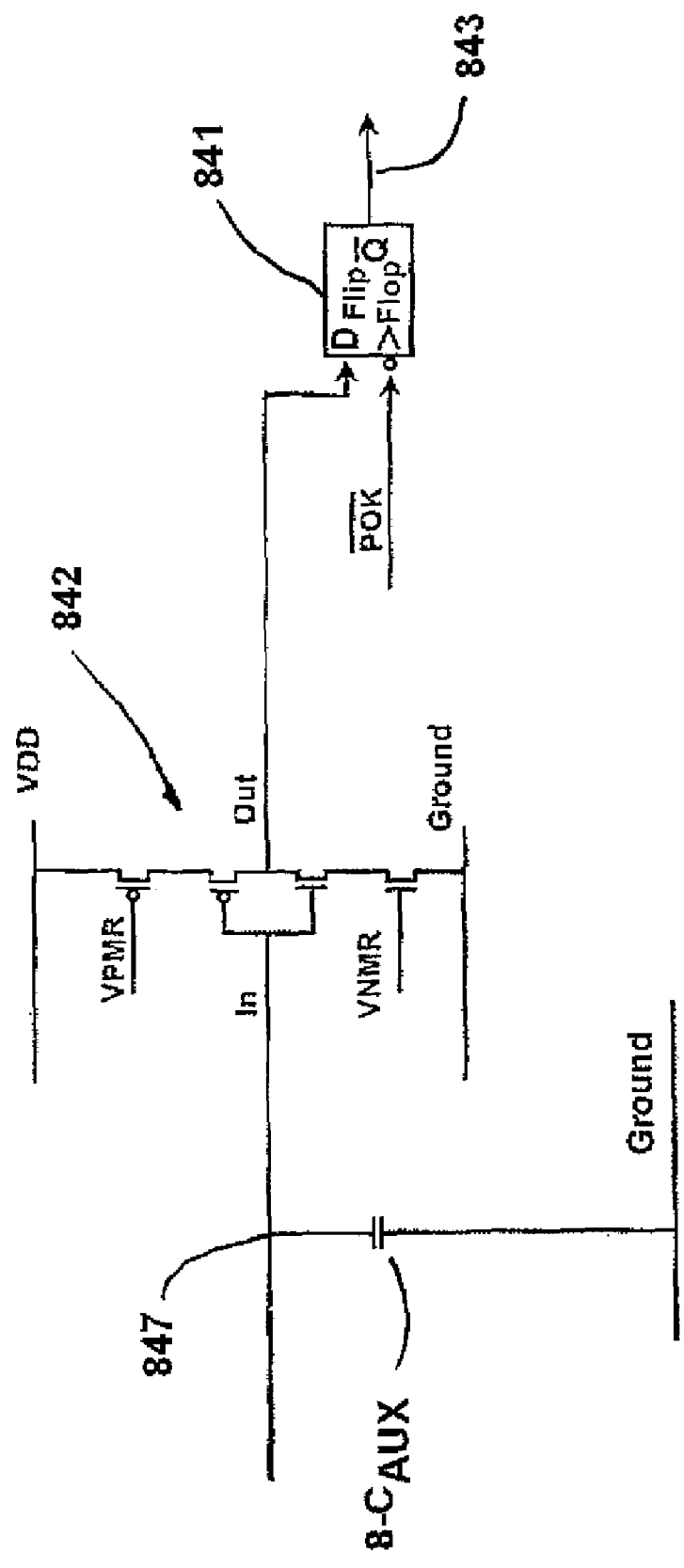
FIG. 8 shows a sample implementation for a state storage flag.

FIG. 1 of the present invention shows a RF tag 10 comprised of a diode 1, such as a Schottky or another type of diode, for accepting power from the main power line 6. The main power line 6 powers both, a main digital section 3 of the RF tag 10 and a capacitor $C_{Aux}$ 5. The power accepted by the diode 1 is generated by the RF tag antenna 4 in conjunction with a well known power receiving circuit (not shown) when RF energy is received from a base station.

The capacitor $C_{Aux}$ is charged to a sufficient voltage to power a mirror latches mechanism 2 which may hold copies of state information of the RF tag 10. At any time during the operation of the RF tag 10, the processing of the main digital section 3 may place or save relevant information in to the mirror latches mechanism 6. This capacitor $C_{Aux}$ is provided as a power source for the mirror latch mechanism 2 to enable it to retain the essential state indicators during the interval when the power supply to the RF tag is interrupted, for example the base station hops to a new frequency. The power from the capacitor $C_{Aux}$ is provided to only a few transistors of the RF tag 10 and is not used to power up the clock or other RF tag 10 electronics. Therefore, the amount of required energy is small and may be provided by a relatively small capacitor. Furthermore, when the power is restored or reapplied and the RF tag 10 restarts, the information retained in the mirror latches mechanism 2 may be read back into the main digital section 3 to be used in the subsequent operation of RF tag 10 operation.

The information to be retained or saved may include both, the major and the minor state indicators. Some minor state information, such as the address from which the base station attempted to access data when the power is removed, need not be saved and may be allowed to be lost with little impact on the communication protocol initiated by the base station. That is because the whole command including the address must be re-sent by the base station.

FIG. 2 shows another embodiment of the present invention. In this embodiment, the power line 7 for the mirror latches mechanism 2 is independent. The capacitor $C_{Aux}$ is connected directly to the antenna-lead-in 4 and may illustratively use a Schotty diode 8 to rectify the RF energy received by the antenna which is not shown in the figure.

In yet another embodiment shown in FIG. 3, a PFET transistor 9 may be used instead of the diode 1 (FIG. 1). The supply of voltage $V_{DD}$ may vary very slowly, so that the transistor 9 may effectively rectify voltage for charging the capacitor $C_{Aux}$.

Turning back to FIG. 1, please note that the size of the capacitor $C_{Aux}$ and the leakage current therefrom determines the time interval during which the mirror latches mechanism 2 will store a copy of the state information. When the power sent to the RF tag 10 from the antenna 4 is too low, the voltage $V_{DD}$ 6 may fall below a threshold value sufficient to energize the RF tag electronics reliably. In such a situation, a powerno-good signal (POK_), as shown in FIGS. 6a-c is issued by a separate RF tag circuitry to prevent the RF tag 10 from any further processing. Nevertheless, the mirror latches mechanism 2 will maintain the copy of the state information, for a period time initiated when the RF tag is powered up and continuing as long as it takes for the leakage current to drain the capacitor $C_{Aux}$ 5 through the mirror latches mechanism 2. Please note that when a RF signal burst of a different or second frequency is sent from the base station, other RF tags 10 in the array will be powered up. Each RF tag may be energized by the RF signal bursts of different frequencies see the example described in the Background of the Invention section. Hence, some RF tags from a first set may be powered up, by the RF signal bursts of frequencies other then the first frequency and will attempt to change their state.

As explained, the inventive RF tag 10 is constructed to retain the state information that was stored in the mirror latches mechanism 2 during a first application of the RF signal burst at a frequency suitable to power up that RF tag 10. The RF tag 10 will be powered until the base station performs a frequency hop to a frequency, which may or may not be suitable to power this particular RF tag 10 depending upon the RF environment of the tag array. The state information stored in the mirror latches mechanism 2 is retained until the base station, at a later time, reapplies the RF signal burst suitable to re-power up the RF tag 10 to the set threshold level. When the RF tag 10 is re-powered, it is permitted to down load and use the state information retained in the mirror latches mechanism 2. So, when the RF tag 10 is re-powered, the state information maintained in the mirror latches mechanism 2 is read and used to reset the states of the RF tag 10. However before the state information is used, the voltage across $C_{Aux}$ must be checked to ascertain that it has not fallen to a threshold level where the information maintained in the mirror latches 2 is no longer trustworthy.

FIG. 4 shows a power-no-good signal 45 applied as an input to a flip flop circuit 41, another input to that flip flop circuit 41 being the output of a check circuit 42. When the power-no-good signal 45 falls while the $V_{DD}$ on line 6 is sufficient to power the RF tag 40, the check circuit 42 determines if the voltage $V_{Aux}$ across the capacitor $C_{Aux}$ 5 is high enough with respect to the value of the voltage $V_{DD}$. Thereby if the determined voltage is high enough, a signal 43 is outputted to permit the use of the information stored in the mirror latches 2. If on the other hand, the voltage level of the capacitor $C_{Aux}$ is determined to be less then the threshold, the integrity of the information contained in the mirror latches mechanism 2 is considered suspect and is not used. An example of a check circuit 42 for checking the voltage $V_{Aux}$ across the capacitor $C_{Aux}$ is shown in FIG. 5

FIG. 6a shows the voltage $V_{DD}$ as a function of time during the energizing of the RF tag by a single burst of RF energy. When the RF burst is broadcast to the RF tag 10 (FIG. 4), the power supply $V_{DD}$ (FIG. 4) starts to charge the capacitor $C_{Aux}$ (FIG. 4). At time $T_1$ the voltage may charge the capacitor $C_{power}$ (FIG. 2) to a sufficiently high voltage to render the RF tag 10 operative, and the power-no-good signal POK_ will be removed. This signal POK_ is issued in the region 64 shown in FIG. 6b. to tell the electronic components of the RF tag 40 (FIG. 4) that there is insufficient power for reliable operation. When $V_{DD}$ reaches the threshold level for stable operation at $T_1$, the power-no-good signal POK_ falls and a power-good signal POK comes on as shown in FIG. 6c.

Returning now to FIG. 4, the power-no-good POK_ signal 45 is used to prevent $C_{Aux}$ from charging when the voltage $V_{DD}$ on line 6 is falling after the power burst has been applied and when the voltage $V_{DD}$ on line 6 is increasing as represented by region 64 (FIG. 6b). When the power-no-good signal POK_ 45 falls at $T_1$ (FIG. 6a), the transistor 1 is rendered conductive to apply current to recharge $C_{Aux}$. Furthermore, to assure that the voltage $V_{Aux}$ 46 across the capacitor $C_{Aux}$ is not changing while the decision is being made as to whether to use the information in the mirror latches mechanism 2 powered by the capacitor $C_{Aux}$, an optional delay circuit 44 may be used to assure that the period allocated to decision making is long enough.

Tags built with the new RFID chip (G2) are intended to be backwards compatible with the existing first generation chips. However, several features will be added to these new chips to improve their performance in the field and to make them compatible with radio regulations in various parts of the world. The design modifications include:

Add a logic state holding capacitor/circuit (superbit) in the digital state machine that will maintain information that the chip has been identified for a minimum of four seconds. This state information may be group selected. State hold is implemented as a group_select_flags, group_select_not_equal_flags (GSF, GSNF) and group_unselect_flags, group_unselect_not_equal_flags (GUSF, GUSNF). These commands will be short—(preamble+SD+SD+3 bytes+CRC)—and select on the status of the superbit flag as well as the write_ok flag.

This invention describes a way of preserving the information on a passive RFID tag after it loses power in the field. This invention solves the problem of tags losing their state information once it loses power for short periods of time.

This invention greatly enhances the read rate of RFID tags in the field in a real life environment where there are a zeros, by giving tags a "memory" of what state it was in before it lost power. If the tag was not able to remember the state it was in before it lost power, then the reader would have to sent out additional command to the tag creating delays and redundancy in the identification protocol.

With this solution, the identification rate can be improved and certainly prevent the deterioration of identification rate of tags when there is poor RF environment. Intermec accrues substantial advantage over competitors in having a robust tag.

A passive RFID tag is solely powered from the RF field emission from the base station antenna. Due to reflections from walls, floors and ceilings, there are locations in the purview of the basestation where the field goes to zero or becomes very low. This phenomena called multipathing gets compounded when the basestation uses a frequency hopping RF field pattern, where the zero's get distributed to multiple locations. In applications where the RFID tag is expected to maintain its state after is powered, the presence of a zero at the tag locations depowers the tag and destroys information stored in the tag. This can cause protocols which identify the presence of multiple tags in the field very inefficient and large delays result in fully identifying all the tags. In many cases, the information that is needed to fully define the tag state is a few bits.

For such situations a simple solution would be to have a "state preservation cell" that can store a bit value. Thus once the tag fully loses its power, and when it get power back, it can use the state information in the state preservation cell to fully get back to the original state it was in before it lost power. The duration for which the state preservation cell can hold out would determined primarily by leakage on parasitic elements.

The voltage on the capacitor is a mirror value of input (lower than the input by a diode drop). When INPUT goes low the capacitor (as when the tag gets depowdered), the capacitor continues to hold the charge and the value of INPUT, which is then reflected at the output. For the above implementation the value of OUTPUT should be latched onto INPUT when the tags gets its power again (this is not shown in the above diagram).

In one implementation, a "superbit" state hold capacitor can be set when the tag goes into the Data_exchange state. The state hold capacitor may hold its set condition for a minimum of four seconds, for example, a time much larger than a fifty microsecond "pause time" during which power may be lost between frequency hops in frequency hop energization of the tag, and corresponding to a substantial number of frequency hop pulse times which may have a duration of 300-400 milliseconds (see U.S. Pat. No. 5,850,181 which is hereby incorporated herein by reference in its entirety). The state of the "superbit" state hold capacitor may be used to "unselect" the tag so that it does not respond to a subsequent multitag protocol command to identify.

In another embodiment, the Data_exchange state of the tag is restored by the set condition of the state hold capacitor if power to the tag from an external field is restored within four seconds, so that the tag will not participate in a subsequent multitag protocol until specifically reset to the Ready state. In this case the "unselect" command would not be required to prevent interference of the tag with the subsequent multitag identification protocol.

Discussion from Incorporated Nonprovisional Application Ser. No. 10/373,628 Filed Feb. 24, 2003

This invention is a methodology for enhancing RFID performance when identifying or writing to two or more tags. Both methodologies become crucial to performance when a substantial number of tags, for example ten or more, are being identified or written. The methodology is embodied by two commands that will specifically select RFID tags based on certain selection criteria. The criteria for selection can be set based on user requirements and the user can do the following operations 1) selection of any combination of a subset of available flags
2) selection based on matching flag condition
3) selection based on non-matching flag condition The flags that are currently available are state_storage flag and write_ok flag. The state storage flag indicates whether or not the tag was in a specific state (DATA_EXCHANGE_STATE) prior to losing power and the write_ok flag indicates if the last write operation of the EEPROM was done with adequate power supply (i.e. a good write was done into the EEPROM memory matrix).

The two commands that perform the selection of tags are
1) Group select flags—this will move tags from the READY state to the ID state
2) Group unselect flags—this will move tags from the ID to the READY state.

Both command will do their respective operations only if the flags on a tag match the selection criteria.

Detailed description of the group select flags commands is as follows-

The various fields for group_select_flags for selecting on the write_ok flag and the state_storage flag are as follows:-

<preamble> <command> <bit_mask> <data> <crc>

Both the bit_mask and the data fields are one byte fields. The bit_mask will enable selection on flags and once a bit flag is enabled, the value of the data field will enable selection on flag high or low. For example, if the last two bits of the bit_mask and the data field are used for state_storage and write_ok(LSB) in that order, then a few scenarios are as follows:- (only last two bits for each field are shown)

| BM Data | |
|---|---|
| 11 11 | will select all tags with state_storage set and write_ok set |
| 11 01 | will select all tags with state_storage not set and write_ok set |
| 01 11 | will select all tags with state_storage set |

The original description of the invention follows:

Review of Chip State Storage Capability

Objective

Tags losing power while in the middle of the Multi-Item protocol add enoromous latency to the protocol efficiency. Tags can lose power while in the ID state of the DATA_EXCHANGE state. Intuitively tags loosing power in the DATA_EXCHANGE add longer times to the protocol because they have to go through the ID state (without loosing power) and finally end in the DATA_EXCHANGE state; whereas tags loosing power in the ID state add lesser time overhead relatively. Thus if a technique that could prevent tags that were in the DATA_EXCHANGE state (and lost power) from coming back into the protocol to be identified, this would save considerable time. It must be noted that it is difficult to delineate the exact amount of overhead that the two situations (tags loosing power in the ID state, tags loosing power in the DATA_EXCHANGE state) contribute by themselves.

Requirements from a System Standpoint

1) To identify all the tags within the range of a reader (regardless of whether they were identified before or not)
2) To identify only tags that were identified (brought to DATA_EXCHANGE) but subsequently lost power
3) To avoid inclusion of tags that were identified once back to the protocol loop once again Solution The above three requirements can be met with the following solution. The tag have the capability of storing a voltage ($V_{STORAGE}$) on a high impedance mode (e.g. high impedance node 847, FIG. 8) that is charged high when the tag goes to DATA_EXCHANGE state—the voltage would also be discharged when an INITIALISE command or an appropriate GROUP_SELECT command is issued from the reader.

Review of Chip State Machine Architecture with the Above Modification

The Gamma ASIC has three major states—READY, ID and DATA_EXCHANGE. With the above modification, the following table indicates the storage value vs. tag state

| TAG STATE | $V_{STORAGE}$ |
|---|---|
| READY | Can be high or low |
| ID | Low |
| DATA_EXCHANGE | High |

$V_{STORAGE}$ is high in the READY state if the tag was previously identified and lost power and went back into the ready state.

Additional Commands Required

Additional commands have to be added to the capability of the reader to enable selection/non-selection of tags with $V_{STORAGE}$ high/low GROUP_SELECT_EQ_SS—This command will select only tags that have $V_{STORAGE}$ high.

GROUP_SELECT_EQ_NSS—This command will select only tags that do not have $V_{STORAGE}$ high (tags that were not identified, or tags which had $V_{STORAGE}$ high but the voltage discharged off, or tags which had the high $V_{STORAGE}$ reset to low with an INTIALISE command)

Note that a GROUP_SELECT_EQ command will select all the tags; and all other commands will not differentiate between a tag that has $V_{STORAGE}$ high vs. $V_{STORAGE}$ low.

(The foregoing subject matter was incorporated herein by reference in its entirety as APPENDIX A in the present case as filed.)

Incorporation by Reference

U.S. Pat. Nos. 5,550,547, 5,850,181 and 5,673,037 are hereby incorporated by reference as providing background information to assist in understanding the foregoing disclosure.

U.S. Pat. No. 6,404,325, which is incorporated herein by reference by reference, shows circuitry in FIGS. 4 and 5 which may be utilized to serve as a state storage flag, e.g. as shown in FIG. 8, to indicate whether the tag was or was not in a specific state, e.g. DATA_EXCHANGE state. For example, a capacitor such as C(Aux) in FIG. 4 may be charged only when the tag goes to the DATA_EXCHANGE state prior to loosing power. The check circuit and flip-flop 41 of FIG. 5 may provide the state storage flag output at line 43 from the high impedance node that is charged high when the tag goes to DATA_EXCHANGE state. The voltage on the high impedance node would be discharged when an INITIALISE command or an appropriate GROUP_SELECT command is issued from the reader.

Description of FIG. 8

U.S. Pat. No. 6,404,325, which is incorporated herein by reference, shows circuitry in FIGS. 4 and 5 which may be utilized to serve as a state storage flag, e.g. as shown in FIG. 8, to indicate whether the tag was or was not in a specific state, e.g. DATA_EXCHANGE state. For example, a capacitor such as 8-CAux in FIG. 8 may be charged only when the tag goes to the DATA_EXCHANGE state prior to losing power. A check circuit 842 and flip-flop 841 of FIG. 8 may provide the state storage flag output at line 843 from the high impedance node 847 that is charged high when the tag goes to DATA_EXCHANGE state. The voltage on the high impedance node 847 would be discharged when an INITIALISE command or an appropriate GROUP_SELECT command is issued from the reader.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

The following Appendix A is incorporated herein by reference in its entirety.

APPENDIX A

This invention is a methodology for enhancing RFID performance when identifying or writing to two or more tags. Both methodologies become crucial to performance when a substantial number of tags, for example ten or more, are being identified or written. The methodology is embodied by two commands that will specifically select RFID tags based on certain selection criteria. The criteria for selection can be set based on user requirements and the user can do the following operations 1) selection of any combination of a subset of available flags
2) selection based on matching flag condition
3) selection based on non-matching flag condition The flags that are currently available are state_storage flag and write_ok flag. The state storage flag indicates whether or not the tag was in a specific state (DATA_EXCHANGE_STATE) prior to loosing power and the write_ok flag indicates if the last write operation on the EEPROM was done with adequate power supply (i.e. a good write was done into the EEPROM memory matrix).

The two commands that perform the selection of tags are
1) Group select flags—this will move tags from the READY state to the ID state
2) Group unselect flags—this will move tags from the ID to the READY state.

Both command will do their respective operations only if the flags on a tag match the selection criteria.

Detailed description of the group select flags commands is as follows-

The various fields for group_select_flags for selecting on the write_ok flag and the state_storage flag are as follows:-

<preamble> <command> <bit_mask> <data> <crc>

Both the bit_mask and the data fields are one byte fields. The bit_mask will enable selection on flags and once a bit flag is enabled, the value of the data field will enable selection on flag high or low. Eg if the last two bits of the bit_mask and the data field are used for state_storage and write_ok(LSB) in that order then a few scenarios:- (only last two bits for each field are shown are shown)

| BM | Data | |
|----|------|---|
| 11 | 11 | will select all tags with state_storage set and write_ok set |
| 11 | 01 | will select all tags with state_storage not set and write_ok set |
| 01 | 11 | will select all tags with state_storage set |

The original description of the invention follows:

Review of Chip State Storage Capability

Objective

Tags losing power while in the middle of the Multi-Item protocol add enormous latency to the protocol efficiency. Tags can loose power while in the ID state or the DATA_EXCHANGE state. Intuitively tags loosing power in the DATA_EXCHANGE add longer times to the protocol because they have to go through the ID state (without loosing power) and finally end in the DATA_EXCHANGE state; whereas tags loosing power in the ID state add lesser time overhead relatively. Thus if a technique that could prevent tags that were in the DATA_EXCHANGE state (and lost power) from coming back into the protocol to be identified, this would save considerable time. It must be noted that it is difficult to delineate the exact amount of overhead that the two situations (tags loosing power in the ID state, tags loosing power in the DATA_EXCHANGE state) contribute by themselves.

Requirements from a System Standpoint

1) To identify all the tags within the range of a reader (regardless of whether they were identified before or not)

2) To identify only tags that were identified (brought to DATA_EXCHANGE) but subsequently lost power 3) To avoid inclusion of tags that were identified once back to the protocol loop once again Solution The above three requirements can be met with the following solution The tag have the capability of storing a voltage ($V_{STORAGE}$) on a high impedance node that is charged high when the tag goes to DATA_EXCHANGE state—the voltage would also be discharged when an INITIALISE command or an appropriate GROUP_SELECT command is issued from the reader.

Review of Chip State Machine Architecture with the Above Modification

The Gamma ASIC has three major states—READY, ID and DATA_EXCHANGE. With the above modification, the following table indicates the storage value vs. tag state

| TAG STATE | $V_{STORAGE}$ |
|---|---|
| READY | Can be high or low |
| ID | Low |
| DATA_EXCHANGE | High |

$V_{STORAGE}$ is high in the READY state if the tag was previously identified and lost power and went back into the ready state.

Additional Commands Required

Additional commands have to be added to the capability of the reader to enable selection/non-selection of tags with $V_{STORAGE}$ high/low GROUP_SELECT_EQ_SS—This command will select only tags that have $V_{STORAGE}$ high.

GROUP_SELECT_EQ_NSS—This command will select only tags that do not have $V_{STORAGE}$ high (tags that were not identified, or tags which had $V_{STORAGE}$ high but the voltage discharged off, or tags which had the high $V_{STORAGE}$ reset to low with an INTIALISE command)

Note that a GROUP_SELECT_EQ command will select all the tags; and all other commands will not differentiate between a tag that has $V_{STORAGE}$ high vs. $V_{STORAGE}$ low.

Incorporation by Reference

U.S. Pat. Nos. 5,550,547, 5,850,181 and 5,673,037 are hereby incorporated by reference as providing background information to assist in understanding the foregoing disclosure.

U.S. patent application Nos. 10/373,628 filed Feb. 24, 2003, 60/493,248 filed Aug. 7, 2003, and 60/493,688 filed Aug. 7, 2003, and an Application filed via Express Mail Label EV 331 318 018 on Aug. 18, 2003 in the names of Martinez, Heinrich, Pillai and Ramamurthy and entitled "Radio Frequency Identification System and Method for Increasing Identification Throughput", are each hereby incorporated herein by reference in their entireties, including appendices, drawings and incorporated material. Also incorporated herein by reference in its entirety is each of ISO/IEC 18000 Part 6—RFID Air Interface standard for item management at UHF, as available currently, and ISO/IEC JTC 1/SC 31/WG 4/SG 3 N311 as dated 2002 May 4, ISO/IEC CD 18000-6, entitled "Information Technology—Radio Frequency Identification (RFID) for Item Management—Part 6: Parameters for Air Interface Communications at 860-930 MHz".

Having thus described our invention, what we claim as new, and desire to secure by Letters Patent is:

1. A method for maintaining information in a Radio Frequency transponder, said information being retained during a period when no power is supplied to said transponder, the method comprising the steps of:
   (a) applying power to said transponder from an external field;
   (b) after removal of the power applied to said transponder, utilizing stored energy from the applied power to retain the information during the period when no power is applied to said transponder; and
   (c) utilizing the retained information to restore the transponder to a state represented by the retained information when the transponder is again subjected to an external field even after a substantial time interval with no power from an external field.

2. The method of claim 1, wherein the information is retained in an auxiliary volatile storage by the stored energy from the applied power for a substantial time interval of at least one second.

3. The method of claim 2, wherein the energy required to retain information in the auxiliary volatile storage is stored in an auxiliary charge storage which substantially only supplies energy to said auxiliary volatile storage.

4. The method of claim 1, wherein power is applied to the transponder at intervals such that the stored energy should remain adequate to retain said information, for the time intervals between successive applications of power, when a multitag identification operation is being carried out including said transponder.

5. The method of claim 1, wherein the information is stored in an auxiliary volatile storage for a substantial time period after removal of power applied to the transponder, and the stored information is transferred to a different section of the transponder when power is again applied to said transponder, the energy required to retain information in the auxiliary volatile storage being stored in an auxiliary charge storage device which does not supply energy to the different section of the transponder.

6. The method of claim 1, wherein the energy required to retain information in the auxiliary volatile storage is stored in an auxiliary charge storage which substantially only supplies energy to said auxiliary volatile storage.

7. The method of claim 1, wherein the information is retained in an auxiliary volatile storage by the stored energy from the applied power for a substantial time interval of at least a plurality of seconds.

8. The method of claim 7, wherein the information is stored in an auxiliary volatile storage for a substantial time period after removal of power applied to the transponder, and the stored information is transferred to a different section of the transponder when power is again applied to said transponder, the energy required to retain information in the auxiliary volatile storage being stored in an auxiliary charge storage device which does not supply energy to the different section of the transponder.

9. An RF tag comprising:
   (a) a tag antenna for receiving RF power and modulated RF information signals sent to said RF tag by a base station;

(b) a first tag voltage rectification circuit coupled to said tag antenna for receiving said RF power from said tag antenna and for providing power to the electronic components of said RF tag, said electronic components receiving said power only from said first tag voltage rectification circuit;

(c) a main memory;

(d) a volatile auxiliary memory for storing state information in the absence of a received RF power signal; and (e) an auxiliary power capacitor for storing energy while the antenna is receiving RF power, for energizing said volatile auxiliary memory, where said auxiliary power capacitor retains sufficient energy to power said volatile auxiliary memory so as to retain the stored state information for a substantial period of time of at least one second after said RF power to said RF tag is removed.

10. The RF tag of claim 9, further comprising a second tag voltage rectification circuit coupled to said tag antenna for receiving said RF power from said tag antenna, said electronic components receiving said power only from said first tag voltage rectification circuit, and said auxiliary capacitor receiving power only from said second tag voltage rectification circuit.

11. The RF tag of claim 10, wherein said second tag voltage rectification circuit comprises a PFET transistor.

12. A method of effecting a multi-tag identification operation, comprising the steps of:

(a) providing RF energy to a plurality of RF tags disposed in a field region thereof to activate at least one of said plurality of RF tags, wherein at least said one RF tag includes a power storage device, and a volatile information retaining device;

(b) supplying energy to said power storage device, whereby said power storage device can power said volatile information retaining device for a substantial time interval when said one RF tag is de-activated; and (c) utilizing the power storage device to retain state information comprising information that said one RF tag has been identified.

13. The method of claim 12, wherein the information is retained in the volatile information retaining device by the stored energy of the power storage device for time interval of at least one second.

14. The method of claim 12, wherein the energy required to retain information in said volatile information retaining device is stored in the power storage device which substantially only supplies energy to said volatile information retaining device.

15. The method of claim 12, wherein power is applied to the transponder at intervals such that the stored energy of the power storage device should remain adequate to retain said information, for the time intervals between successive applications of power, when a multitag identification operation is being carried out including said transponder.

16. The method of claim 12, wherein the state information is stored in said volatile information retaining device for a substantial time period after removal of power applied to the transponder, and the stored state information is transferred to a different section of the transponder when power is again applied to said transponder, the energy required to retain the state information in said volatile information retaining device being stored in the power storage device which does not supply energy to the different section of the transponder.

17. The method of claim 12, wherein the energy required to retain the state information in said volatile information retaining device is stored in the power storage device which substantially only supplies energy to said volatile information retaining device.

18. The method of claim 12, wherein the information is retained in the volatile information retaining device by the power storage device for a substantial time interval of at least a plurality of seconds.

19. An RF tag comprising:

(a) a tag antenna for receiving RF power and modulated RF information signals sent to said RF tag by a base station;

(b) a tag voltage rectification circuit coupled to said tag antenna for receiving said RF power from said tag antenna and for providing power to the electronic components of said RF tag;

(c) a main memory;

(d) a volatile auxiliary memory for storing state information upon interruption of the received RF power signal;

(e) an auxiliary power capacitor for storing energy while the antenna is receiving RF power, for energizing said volatile auxiliary memory, where said auxiliary power capacitor retains sufficient energy to power said volatile auxiliary memory so as to retain the stored state information for a substantial period of time after said RF power to said RF tag is removed; and (f) a circuit for transferring the stored state information from the volatile auxiliary memory to the main memory when RF power is again received by the tag voltage rectification circuit.

20. The RF tag of claim 19, wherein the auxiliary power capacitor retains sufficient energy to power said volatile auxiliary memory so as to retain the stored state information for a substantial period of time of at least one second after said RF power to said RF tag is removed.

21. A method of effecting a multitag identification operation, comprising the steps of:

(a) providing RF energy to a field region containing a plurality of RF tags to activate at least one of said plurality of RF tags, wherein at least said one RF tag includes a volatile information retaining device comprising a power storage device; and (b) supplying energy to said power storage device of said one tag during receipt of adequate RF energy to activate said one tag, whereby said volatile information retaining device of said one tag retains information for a substantial time interval even when the supply of said RF energy is present in the field region but is no longer adequate to activate said one tag; and (c) utilizing the volatile information retaining device to retain information that said one RF tag has been identified during a multitag identification operation.

22. The method of claim 21, wherein the information is retained in the volatile information retaining device by the stored energy of the power storage device for a time interval of at least one second.

23. The method of claim 21, wherein the energy required to retain information in said volatile information retaining device is stored in the power storage device which substantially only supplies energy to said volatile information retaining device.

24. The method of claim 21, wherein RF energy is applied to said one tag at intervals during a multitag identification operation such that the stored energy of the power storage device should remain adequate to retain said information during the time that the multitag identification operation is being carried out.

25. The method of claim 21, wherein state information is stored in said volatile information retaining device for a substantial time period while adequate RF energy is not being received by said one tag, and the stored state information is transferred to a different section of said one tag when adequate RF energy is again applied to said one tag, the energy required to retain the state information in said volatile information retaining device being stored in the power storage device which does not supply energy to the different section of said one tag.

26. The method of claim 25, wherein the energy required to retain the state information in said volatile information retaining device is stored in the power storage device which substantially only supplies energy to said volatile information retaining device.

27. The method of claim 21, wherein the information is retained in the volatile information retaining device by the power storage device for a substantial time interval of one second or so.

28. The method of claim 21, wherein the energy required to retain the information in said volatile information retaining device is stored in the power storage device which substantially only supplies energy to a few transistors.

29. The method of claim 21, wherein the information is retained in the volatile information retaining device by the power storage device for a substantial time interval of a plurality of seconds.

30. The method of claim 21, wherein the supplying of RF energy to said field region changes a characteristic of such RF energy during the multitag identification operation such that adequate RF energy to activate said one tag, is only available at intervals when RF energy of a given characteristic is being supplied, whereby said volatile information retaining device of said one tag retains information for a substantial time interval even when the supply of said RF energy is present in the field region but is not of a characteristic to adequately activate said one tag.

31. The method of claim 30, wherein the supplying of RF energy to said field region changes in the polarization of such RF energy such that adequate RF energy to activate said one tag, is only available at intervals where a given polarization of such RF energy is being supplied.

32. The method of claim 30, wherein the supplying of RF energy to said field region changes in the frequency of such RF energy and adequate RF energy to activate said one tag, is not available during sending of such RF energy at a given frequency.

33. The method of effecting a multitag identification operation, which comprises:
 (a) sending energizing RF energy to RF tags in a field region during a multitag identification operation;
 (b) for certain tags receiving sufficient RF energy, utilizing stored energy to maintain information that such tags have been identified during a substantial time interval while RF energy is being sent to the field region but adequate RF energy is not being received by the certain tags;
 (c) such that the certain tags retain the information that such tags have been identified during the multitag identification operation.

34. The method of claim 33, wherein the stored energy required to retain the information is stored in a power storage device which substantially only supplies energy to retain said information.

35. The method of claim 33 where the certain tags will automatically effectively lose said information at the end of the multitag identification operation when RF energy is not received before the end of said substantial time interval.

36. The method of claim 33, wherein the substantial time interval has a duration of one second or so.

37. The method of claim 33, wherein the energy required to retain the information is stored in a power storage device which substantially only supplies energy to a few transistors.

* * * * *